(No Model.) 2 Sheets—Sheet 2.
C. C. BURMEISTER.
APPARATUS FOR THE EMULSION OF MILK AND FAT BY CENTRIFUGAL FORCE.
No. 304,607. Patented Sept. 2, 1884.
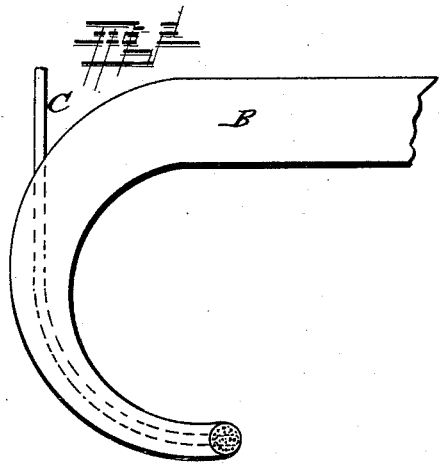
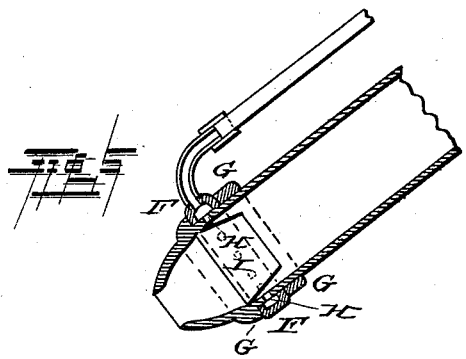
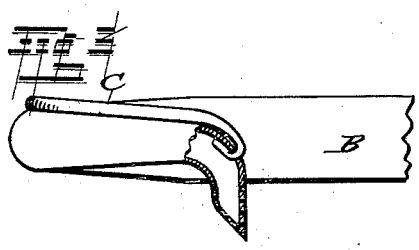
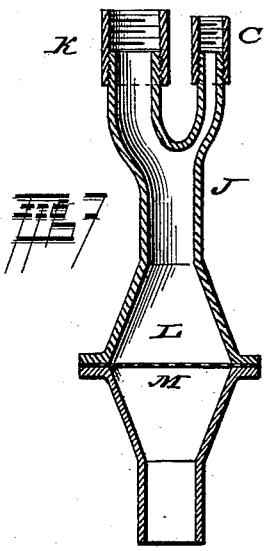
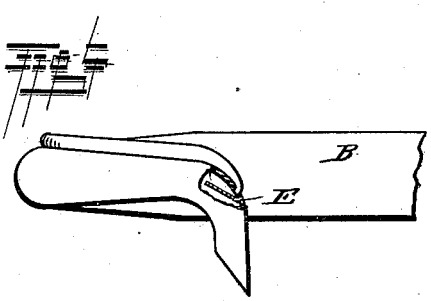
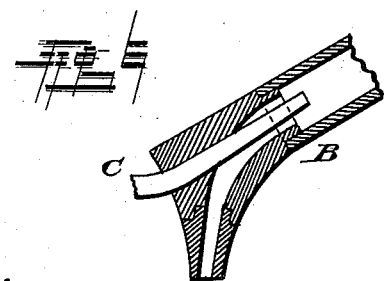
WITNESSES:
Carl Christian Burmeister
INVENTOR.
By Louis Bagger & Co.
ATTORNEYS.

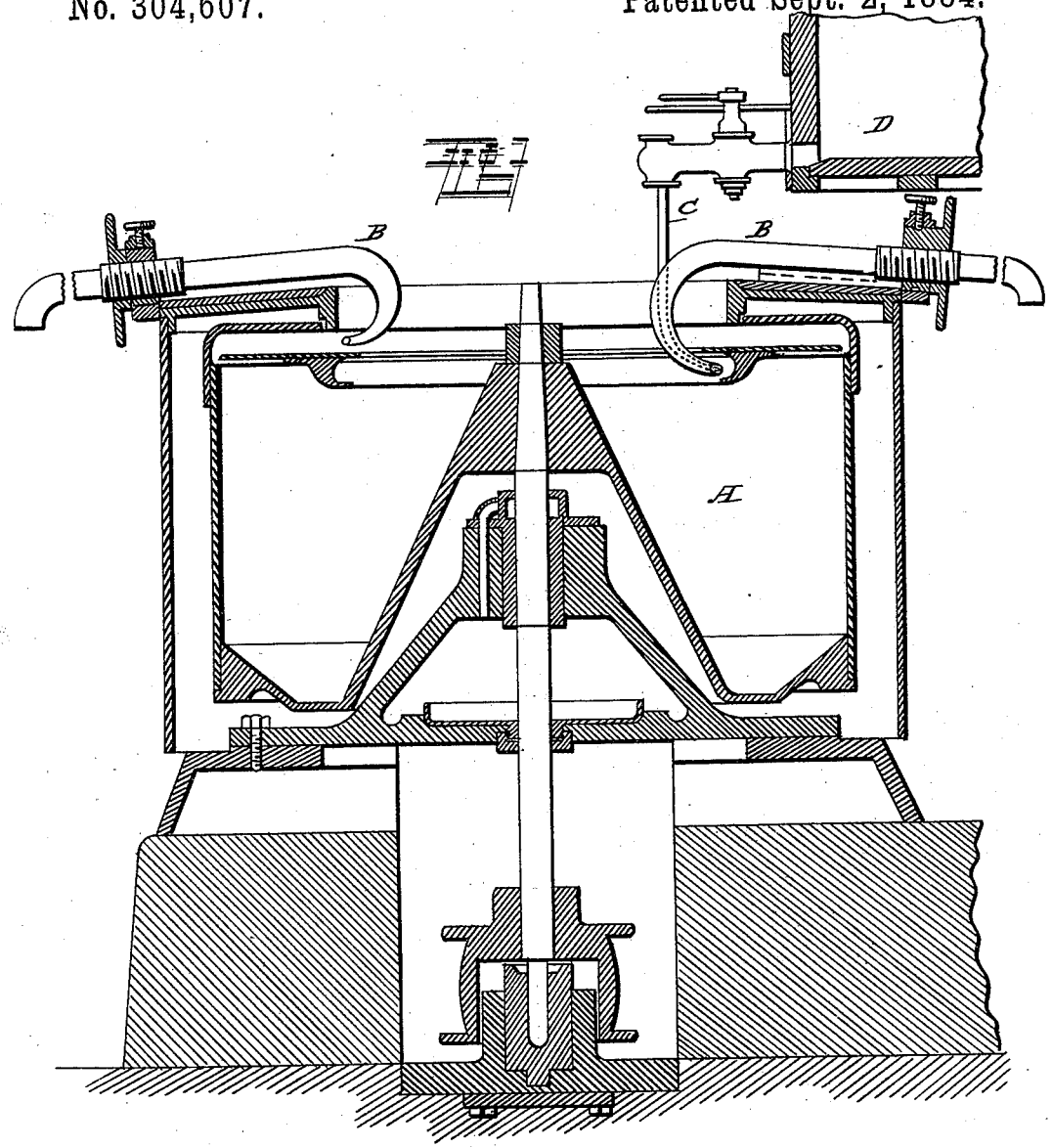

UNITED STATES PATENT OFFICE.

CARL CHRISTIAN BURMEISTER, OF COPENHAGEN, DENMARK, ASSIGNOR TO BURMEISTER & WAINS MASKIN-OG SKIBSBYGGERI, OF SAME PLACE.

APPARATUS FOR THE EMULSION OF MILK AND FAT BY CENTRIFUGAL FORCE.

SPECIFICATION forming part of Letters Patent No. 304,607, dated September 2, 1884.

Application filed August 1, 1884. (No model.)

*To all whom it may concern:*

Be it known that I, CARL CHRISTIAN BURMEISTER, a subject of the King of Denmark, residing at Copenhagen, in the Kingdom of Denmark, have invented certain new and useful Improvements in Apparatuses for the Emulsion of Milk and Fat by Centrifugal Force; and I do declare the following to be a full, clear, and exact description of the invention, such as will enable others skilled in the art to which it appertains, to make and use the same, reference being had to the accompanying drawings, and to the letters and figures of reference marked thereon, which form a part of this specification, and in which—

Figure 1 is a vertical sectional view of a centrifugal cream-separating machine provided with my improved device for enriching either the cream or the skimmed milk. Figs. 2 and 3 are respectively a side and a bottom view of the device. Fig. 4 is a bottom view, partly in section, showing a slight modification of the same. Fig. 5 is a sectional view of another modification. Fig. 6 is a similar view of a modification in which the discharge-pipe is shown straight, and Fig. 7 is a sectional view of a nozzle for injecting mixed fat and milk into the receptacle of the creamer.

Similar letters of reference indicate corresponding parts in all the figures.

My invention has relation to devices for adding fluid fat to the milk or to the component parts of the milk in a centrifugal creamer for the purpose of enriching the same; and it consists in the improved construction and combination of parts of the same, as hereinafter more fully described and claimed. Heretofore either the milk has been enriched by adding the fat to it by emulsion before separating the cream from the skimmed milk, the said emulsion taking place in a separate apparatus, or either the cream or the skimmed milk has been enriched by adding the fat to it by emulsion after the separation of the cream and the skimmed milk, this emulsion also taking place in a separate apparatus from the creamer, and for the purpose of combining both processes and thus saving time and additional apparatus, I construct a device by which the emulsion takes place at the same time that the cream and skimmed milk are separated, which device I will now proceed to describe.

In the accompanying drawings, the letter A indicates the revolving receptacle of the creamer, and B B are the curved pipes which carry off the cream and skimmed milk. The pipe which carries off the part of the milk to be enriched has a small tube, C, leading from the receptacle D, containing the fluid fat, following the outline of its lower portion and opening into its bore near the lower end. The end of the tube which enters the side of the outflow-pipe is turned in a direction away from the inlet end of the said pipe, and it will thus be seen that the inflowing milk or cream will create suction in the fat-conveying tube and draw the fat from the tube into the stream of milk or cream, mixing it with the same.

In Fig. 4 the end of the fat-conveying tube opens flush with the inside of the outflow-pipe, and a small inclined shield, E, is secured below the opening of the tube, extending obliquely before the opening, and thus preventing the outflowing milk or cream from passing into the fat-tube and causing the stream of milk to draw the fat out of the tube.

In Fig. 5 is shown a modification of the device, which simply consists in carrying the fat-tube through the side of the curved end of the outflow-pipe, causing the end of the said tube to be axial to the pipe, the operation of the tube and pipe being the same as in the aforedescribed constructions. For the purpose of accomplishing the same result in centrifugal creamers having straight outflow-tubes which it is desirable to have capable of being turned, I construct the fat-conveying tube opening at its end into a ring, F, hollow upon its inner side, and fitting around the outflow-tube, near its end, at which place it is held in place by means of shoulders or flanges G, and the outflow-pipe is perforated between the said shoulders or flanges, as shown at H, the perforations opening into the hollow space in the ring. A truncate conical shield, I, is secured to the inside of the outflow-pipe below the perforations, serving the same purpose as the shield or bent end of the fat-tube in the constructions hereinbefore described. It follows that, instead of utilizing the suction created in the outflow-pipe, which in some cases may prove to be insufficient, the fat may be injected into the outflow-pipe under pressure, the operation of the pipes being the same.

Where it is desired to inject the fat into the milk before it is separated, the device shown in Fig. 7 is attached to the lower end of the inlet-tube J, the said device consisting of a nozzle, K, having the fat-conveying tube entering it at one side, adapted to be attached to the end of the inlet-tube, and formed with an enlargement, L, near its mouth, in which enlargement a wire sieve, M, is secured; and it will be seen that as the milk and fat enter the nozzle they will mix, and be still more thoroughly mixed by passing through the sieve, so as to enter the creamer as a homogeneous fluid.

Having thus described my invention, I claim and desire to secure by Letters Patent of the United States—

1. In combination with a centrifugal creamer, a cream or milk outlet tube having a fat-conveying tube opening near the opening of the outlet-pipe, and provided with an inwardly-deflecting aperture, as and for the purpose shown and set forth.

2. In combination with a centrifugal creamer, a cream or milk outlet tube having its lower end pointing against the direction of the rotation of the milk-receptacle of the creamer, and a fat-conveying tube entering the outlet-pipe near its end, and having its end pointing into the outlet-pipe, as and for the purpose shown and set forth.

3. In combination with a centrifugal creamer, a cream or milk outlet pipe having its lower end pointing against the direction of the rotation of the milk-receptacle of the creamer, and a fat-conveying tube entering the outlet-pipe near its lower open end, and having its end bent against the inside of the pipe toward the inner or upper portion of the outlet-pipe away from its lower open end, as and for the purpose shown and set forth.

In testimony whereof I affix my signature in presence of two witnesses.

CARL CHRISTIAN BURMEISTER.

Witnesses:
HEINRICH CHRISTIAN PETERSEN.
FREDERIK WOLFF.